US011003599B2

(12) United States Patent
Pan et al.

(10) Patent No.: US 11,003,599 B2
(45) Date of Patent: May 11, 2021

(54) METHOD, APPARATUS AND SYSTEM OF MANAGING EXTERNAL DEVICES, MEMORY AND UNMANNED AERIAL VEHICLE

(71) Applicant: SZ DJI TECHNOLOGY CO., LTD., Shenzhen (CN)

(72) Inventors: Xuyang Pan, Shenzhen (CN); Wei Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 167 days.

(21) Appl. No.: 15/982,490

(22) Filed: May 17, 2018

(65) Prior Publication Data

US 2018/0267908 A1    Sep. 20, 2018

Related U.S. Application Data

(63) Continuation of application No. PCT/CN2015/094962, filed on Nov. 18, 2015.

(51) Int. Cl.
*G06F 13/12* (2006.01)
*H04L 29/08* (2006.01)
*G06F 9/445* (2018.01)

(52) U.S. Cl.
CPC ............ *G06F 13/128* (2013.01); *G06F 9/445* (2013.01); *H04L 67/125* (2013.01); *H04L 67/34* (2013.01); *H04L 67/36* (2013.01)

(58) Field of Classification Search
CPC ....... G06F 13/128; G06F 9/445; H04L 67/34; H04L 67/36; H04L 67/125
See application file for complete search history.

(56) References Cited

U.S. PATENT DOCUMENTS

| 6,205,465 | B1 * | 3/2001 | Schoening | G06F 8/456 709/223 |
| 8,452,475 | B1 * | 5/2013 | West | G07C 5/008 701/29.1 |
| 9,648,107 | B1 * | 5/2017 | Penilla | G06F 9/451 |
| 2012/0137312 | A1 | 5/2012 | Hideo | |
| 2013/0167196 | A1 * | 6/2013 | Spencer | H04W 8/22 726/3 |
| 2014/0320662 | A1 * | 10/2014 | McNamee | H04N 7/181 348/159 |

(Continued)

FOREIGN PATENT DOCUMENTS

CN    101751524 A    6/2010
CN    101867697 A    10/2010

(Continued)

OTHER PUBLICATIONS

The World Intellectual Property Organization (WIPO) International Search Report for PCT/CN2015/094962 dated Aug. 5, 2016 7 Pages (including translation).

*Primary Examiner* — Azizul Choudhury
(74) *Attorney, Agent, or Firm* — Anova Law Group, PLLC

(57) ABSTRACT

A method of managing an external device includes obtaining parameter information of the external device, loading a service module according to the parameter information of the external device, and enabling a communication between a user interface module and a network interface corresponding to the service module.

19 Claims, 7 Drawing Sheets

(56) References Cited

U.S. PATENT DOCUMENTS

| | | | |
|---|---|---|---|
| 2016/0066004 A1* | 3/2016 | Lieu | H04N 21/2541 725/29 |
| 2016/0088021 A1* | 3/2016 | Jayanti Venkata | G06F 8/60 726/1 |
| 2016/0098577 A1* | 4/2016 | Lacey | G06F 21/6263 726/28 |

FOREIGN PATENT DOCUMENTS

| | | |
|---|---|---|
| CN | 101957725 A | 1/2011 |
| CN | 102945170 A | 2/2013 |
| CN | 202818392 U | 3/2013 |
| CN | 103959208 A | 7/2014 |
| CN | 203689896 U | 7/2014 |
| CN | 104539676 A | 4/2015 |
| CN | 204568058 U | 8/2015 |
| JP | 2015022489 A | 2/2015 |

\* cited by examiner

METHOD, APPARATUS AND SYSTEM OF MANAGING EXTERNAL DEVICES, MEMORY AND UNMANNED AERIAL VEHICLE

CROSS-REFERENCE TO RELATED APPLICATION

This application is a continuation of International Application No. PCT/CN2015/094962, filed on Nov. 18, 2015, the entire contents of which are incorporated herein by reference.

TECHNICAL FIELD

The disclosure relates to an architecture for implementing a communication control application or an industrial control application, and more particularly to a method, apparatus and system of managing external devices, a memory and an unmanned aerial vehicle (UAV).

BACKGROUND OF THE DISCLOSURE

A development acceleration of communication control applications or industrial control applications can be possible by using program frameworks such as VC/MFC, WinForm and QT. An updating or setting up of an application, which is developed using those program frameworks, can be complicated and error-prone due to a strong coupling between modules of the application. Moreover, an existing application may have limited functionality and extensibility, leading to bad user experience.

SUMMARY OF THE DISCLOSURE

There is a need to provide a method, apparatus and system of managing external devices, a memory and an unmanned aerial vehicle (UAV) to address the problems in the conventional technology.

The disclosure provides a method of managing an external device. In some embodiments, the method can comprise: obtaining parameter information of the external device; loading a corresponding service module according to the parameter information of the external device; and adding a network interface provided by the loaded service module to communicate with a user interface module.

In some embodiments, loading the corresponding service module according to the parameter information of the external device can comprise: loading the corresponding service module; and establishing a communication connection between the loaded service module and the external device of a corresponding type, such that an operation control function is provided to the external device of the corresponding type by the loaded service module.

In some embodiments, the method can further comprise: sending a network service request to the added network interface using the user interface module; and establishing a connection between the added network interface and the user interface module in response to the network service request, to enable a functional communication between the loaded service module and the user interface module.

In some embodiments, data can be transferred between the user interface module and the network interface in a Json format.

In some embodiments, the method can further comprise: detecting an external device being removed; pushing an external device removal event; and disconnecting a connection between a corresponding network interface and the user interface module and turning off a corresponding service module according to parameter information of the removed external device.

In some embodiments, the method can further comprise, before obtaining parameter information of the external device: detecting an external device being connected to a peripheral interface; and identifying an external device of a particular type according to a preset condition.

In some embodiments, identifying an external device of the particular type according to a preset condition can comprise: obtaining hardware information of the connected external device; and identifying the external device of the particular type according to the preset condition and the hardware information.

In some embodiments, the hardware information can comprise at least a device interface type and a device manufacturer. In some embodiments, the preset condition can be a particular device manufacturer.

In some embodiments, obtaining parameter information of the external device can comprise: turning on the external device and sending a preset identification protocol command to the external device to cause the external device to feedback device information of the external device in response to the preset identification protocol command.

In some embodiments, the parameter information can comprise at least a device type and a device version number.

In some embodiments, the method can further comprise: obtaining a current version parameter of a current service module and a version parameter of the service module in a server upon receiving a starting signal; comparing the current version parameter with the version parameter in the server; and downloading and installing a service module from the server if the service module in the server is a newer version.

In some embodiments, downloading and installing a service module from the server can comprise: installing the downloaded service module in a temporary storage area; providing a notification to a user, such that the user decides whether to restart the current service module to update the current service module; turning off the current service module, extracting data in the temporary storage area to replace the service module of the current version, and restarting an updated service module if the user decides to restart the current service module; and extracting data in the temporary storage area to replace data of the service module of the current version after the current service module is turned off if the user decides not to restart the current service module.

In some embodiments, the method can further comprise: searching locally for a current hash value corresponding to a service module in an automatic manner; searching for a patch of the service module matching the current hash value in a server according to the current hash value corresponding to the service module; determining whether a patch list is empty if the patch of the service module matching the current hash value is not found in the server; and cyclically upgrading patches in the patch list if the patch list is not empty.

In some embodiments, the method can further comprise: temporarily storing an access path of the patch of the service module into the patch list if the patch matching the current hash value is found in the server; and updating the current hash value of the service module with a hash value of the patch, and continuing to search for a patch of the service module matching the updated hash value in the server according to the updated current hash value of the service module.

In some embodiments, the method can further comprise: searching for a complete package of the service module matching the current hash value in the server according to the current hash value of the service module if the patch list is empty; and upgrading the complete package of the service module if the complete package of the service module matching the current hash value is not found in the server.

The disclosure further provides n apparatus of managing an external device. In some embodiments, the apparatus can comprise: a user interface module configured to configure and display a user interface; a device identification module configured to obtain parameter information of the external device; and a processing module configured to load a corresponding service module according to the parameter information of the external device and add a network interface provided by the loaded service module to communicate with the user interface module.

In some embodiments, the processing module can be configured to, while loading the corresponding service module according to the parameter information of the external device: load the corresponding service module; and establish a communication connection between the loaded service module and the external device of a corresponding type, such that an operation control function is provided to the external device of the corresponding type by the loaded service module.

In some embodiments, the processing module can be further configured to send a network service request to the added network interface using the user interface module. In some embodiments, the added network interface can be configured to establish a connection between the added network interface and the user interface module in response to the network service request, to enable a functional communication between the loaded service module and the user interface module.

In some embodiments, data can be transferred between the user interface module and the network interface in a Json format.

In some embodiments, the apparatus can further comprise an interface detection module configured to detect an external device being removed. In some embodiments, the processing module can be further configured to push an external device removal event and disconnect a connection between a corresponding network interface and the user interface module and turn off a corresponding service module according to parameter information of the removed external device.

In some embodiments, the apparatus can further comprise an interface detection module configured to detect an external device being connected to a peripheral interface. In some embodiments, the processing module can be further configured to identify an external device of a particular type according to a preset condition.

In some embodiments, the interface detection module can be further configured to obtain hardware information of the connected external device. In some embodiments, the processing module can be further configured to identify the external device of the particular type according to the preset condition and the hardware information.

In some embodiments, the hardware information can comprise at least a device interface type and a device manufacturer. In some embodiments, the preset condition can be a particular device manufacturer.

In some embodiments, the apparatus can further comprise a device instruction input and output module. In some embodiments, the device identification module can be configured to turn on the external device using the device instruction input and output module and send a preset identification protocol command to the external device to cause the external device to feedback device information of the external device to the device identification module in response to the preset identification protocol command.

In some embodiments, the parameter information can comprise at least a device type and a device version number.

In some embodiments, the apparatus can further comprise: a starting module configured to turn on the management apparatus upon receiving a starting signal; and an updating module configured to, after the starting signal is received by the starting module, obtain a current version parameter of a current service module and a version parameter of the service module in a server, compare the current version parameter with the version parameter in the server, and download and install a service module from the server if the service module in the server is a newer version.

In some embodiments, the updating module can be configured to install the downloaded service module in a temporary storage area. In some embodiments, the processing module can be further configured to provide a notification to a user, such that the user decides whether to restart the current service module to update the current service module. In some embodiments, the updating module can be further configured to turn off the current service module, extract data in the temporary storage area to replace the service module of the current version, and restart an updated service module if the user decides to restart the current service module. Alternatively, the updating module can be further configured to extract data in the temporary storage area to replace data of the service module of the current version after the current service module is turned off if the user decides not to restart the current service module.

In some embodiments, the updating module can be configured to search locally for a current hash value corresponding to a service module in an automatic manner, and search for a patch of the service module matching the current hash value in a server according to the current hash value corresponding to the service module. In some embodiments, the updating module can determine whether a patch list is empty if the patch of the service module matching the current hash value is not found in the server. In some embodiments, the updating module can be further configured to cyclically upgrade patches in the patch list if the patch list is not empty.

In some embodiments, the updating module can be further configured to temporarily store an access path of the patch of the service module matching the current hash value into the patch list if the patch is found in the server, update the current hash value of the service module with a hash value of the patch, and continue to search for a patch of the service module matching the updated hash value in the server according to the updated current hash value of service module.

In some embodiments, the updating module can be further configured to search for a complete package of the service module matching the current hash value in the server according to the current hash value of the service module if the patch list is empty; and upgrade the complete package of the service module if the complete package of the service module matching the current hash value is not found in the server.

In some embodiments, the apparatus can further comprise a starting module and an updating module. In some embodiments, the management apparatus can be entirely provided in a control terminal, and the starting module and the updating module can be triggered simultaneously when the management apparatus is turned on. Alternatively, the user interface module can be provided in a control terminal, the remaining modules of the management apparatus can be provided in an external device, and the starting module and the updating module can be triggered when the external device is powered on or turned on.

The disclosure further provides a system of managing an external device. In some embodiments, the system can comprise: a control terminal; and a processor configured to: obtain parameter information of an external device; load a corresponding service module according to the parameter information of the external device; and add a network interface provided by the loaded service module to communicate with a user interface module.

In some embodiments, the processor can be provided in the control terminal.

The disclosure further provides a memory for storing a program instruction. The program instruction can be configured to, upon being executed by a processor, implement a method comprising: obtaining parameter information of an external device; loading a corresponding service module according to the parameter information of the external device; and adding a network interface provided by the loaded service module to communicate with a user interface module.

In some embodiments, loading the corresponding service module according to the parameter information of the external device can comprise: loading the corresponding service module; and establishing a communication connection between the loaded service module and the external device of a corresponding type, such that an operation control function is provided to the external device of the corresponding type by the loaded service module.

In some embodiments, the program instruction can be further configured to, upon being executed by a processor, implement a method further comprising: sending a network service request to the added network interface using the user interface module; and establishing a connection between the added network interface and the user interface module in response to the network service request, to enable a functional communication between the loaded service module and the user interface module.

In some embodiments, the program instruction can be further configured to, upon being executed by a processor, implement a method further comprising: obtaining a current version parameter of a current service module and a version parameter of the service module in a server upon receiving a starting signal; comparing the current version parameter with the version parameter in the server; and downloading and installing a service module from the server if the service module in the server is a newer version.

The disclosure further provides an unmanned aerial vehicle. The unmanned aerial vehicle can comprise one or more functional components. In some embodiments, a parameter of the one or more functional components can be displayed and configured by the system of managing an external device as described hereinabove.

In some embodiments, the one or more functional components can comprise at least one of a flight controller, an electronic speed controller, a stabilizing device or a remote controller.

With the method of the disclosure, various external devices having different interfaces can be automatically identified. A corresponding operation control function can be provided to an identified external device, and a third party user can be enabled to use a corresponding user interface, thereby there's no need for the user to select applications of different service modules according to different types of external devices.

LIST OF REFERENCE NUMERALS

TABLE 1

| | |
|---|---|
| Management apparatus | 20 |
| Interface detection module | 21 |
| Device identification module | 22 |
| Processing module | 23 |
| Service module | 24 |
| User interface module | 25 |
| Device instruction input and output module | 26 |
| Starting module | 27 |
| Updating module | 28 |
| Control terminal | 30 |
| Display screen | 31 |
| Peripheral interface | 32 |
| Memory | 33 |
| Processor | 34 |
| External device | 40 |
| Management system | 50 |
| Memory | 51 |
| Processor | 52 |
| Step | 101-110, 201-203, 301-304, 401-409 |

The present disclosure will be described in the illustrative embodiments by reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

Figure 1:
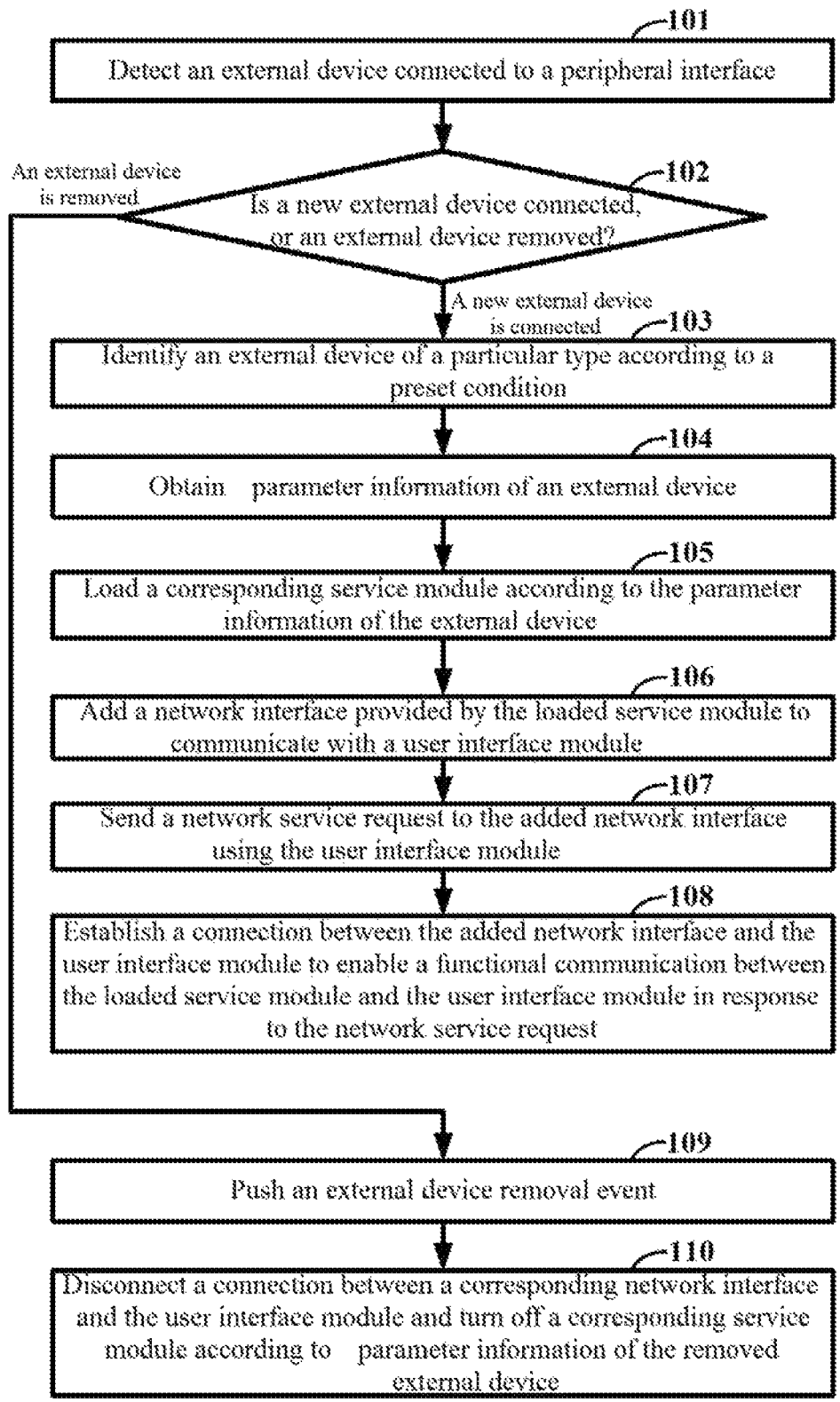
FIG. 1 is a flowchart of a method of managing external devices in accordance with embodiments of the disclosure.

FIG. 1 is a flowchart of a method of managing external devices in accordance with embodiments of the disclosure. The method of embodiments of the disclosure can be implemented by a processor. It will be appreciated that, the method of embodiments of the disclosure is not limited to the specific steps and sequence as shown in the flowchart of FIG. 1. In various embodiments, one or more steps can be added to the steps shown in the flowchart of FIG. 1, one or more steps shown in the flowchart of FIG. 1 can be removed, or a sequence of performing the steps shown in the flowchart of FIG. 1 can be altered. In some embodiments, the method in accordance with embodiments of the disclosure can comprise steps 101 to 110.

In step 101, an external device connected to a peripheral interface can be detected.

In some embodiments, a plurality of peripheral interfaces can be provided. The peripheral interfaces can comprise, but not limited to, a universal serial bus (USB) interface, a micro USB interface or a cluster communication port (COM) interface. Various types of external devices can therefore be connected via the peripheral interfaces. In some embodiments, the external device can be a flight controller, a remote controller for an aerial vehicle, a positioning system (e.g., GPS) or an inertial measurement unit (IMU).

In step 102, a determination can be made as to whether a new external device is connected to the peripheral interface or whether a connected external device is removed from the peripheral interface. A step 103 can be performed if a new external device is connected to the peripheral interface. A step 109 can be performed if an external device is removed from the peripheral interface.

In step 103, an external device of a particular type can be identified according to a preset condition.

In some embodiments, the step 103 can comprise obtaining hardware information of the external device connected to the peripheral interface, and identifying an external device of a particular type according to the preset condition and the hardware information.

In some embodiments, the hardware information can comprise at least a device interface type and a device manufacturer. The preset condition can be a particular device manufacturer, such that a device can be identified only if it is a device from the particular manufacturer.

In some instances, the method in accordance with embodiments of the disclosure can comprise, before step 103, pushing an external device connection event.

In step 104, parameter information of the external device can be obtained.

In some embodiments, the step 104 can comprise turning on the external device and sending a preset identification protocol command to the external device to cause the external device to feedback device information of the external device in response to the preset identification protocol command.

In some embodiments, the parameter information can comprise at least a device type and a device version number.

In step 105, a corresponding service module can be loaded according to the parameter information of the external device.

In some embodiments, the step 105 can comprise loading the corresponding service module and establishing a communication connection between the loaded service module and the external device of a corresponding type, such that an operation control function is provided to the external device of the corresponding type by the loaded service module.

In step 106, a network interface provided by the loaded service module can be added to communicate with a user interface module.

In step 107, a network service request can be sent to the added network interface using the user interface module.

In step 108, a connection between the added network interface and the user interface module can be established in response to the network service request to enable a functional communication between the loaded service module and the user interface module. In other words, a functional communication can be performed between the user interface module and the loaded service module using the network interface provided by the loaded service module.

In some embodiments, data can be transferred between the user interface module and the network interface in a Json format. The network interface can be a websocket.

In step 109, an external device removal event can be pushed.

In step 110, a connection between a corresponding network interface and the user interface module can be disconnected and a corresponding service module can be turned off according to parameter information of the removed external device.

With the method in accordance with embodiments of the disclosure, various external devices having different interfaces can be automatically identified, and various modules can be independent from each other. For instance, a user interface module can be completely separate from a service module, and one service module can be completely separate from another service module. A corresponding operation control function can be provided to an identified external device, and a third party user can be enabled to use a corresponding user interface, thereby there's no need for the user to select applications of different service modules according to different types of external devices.

Figure 2:
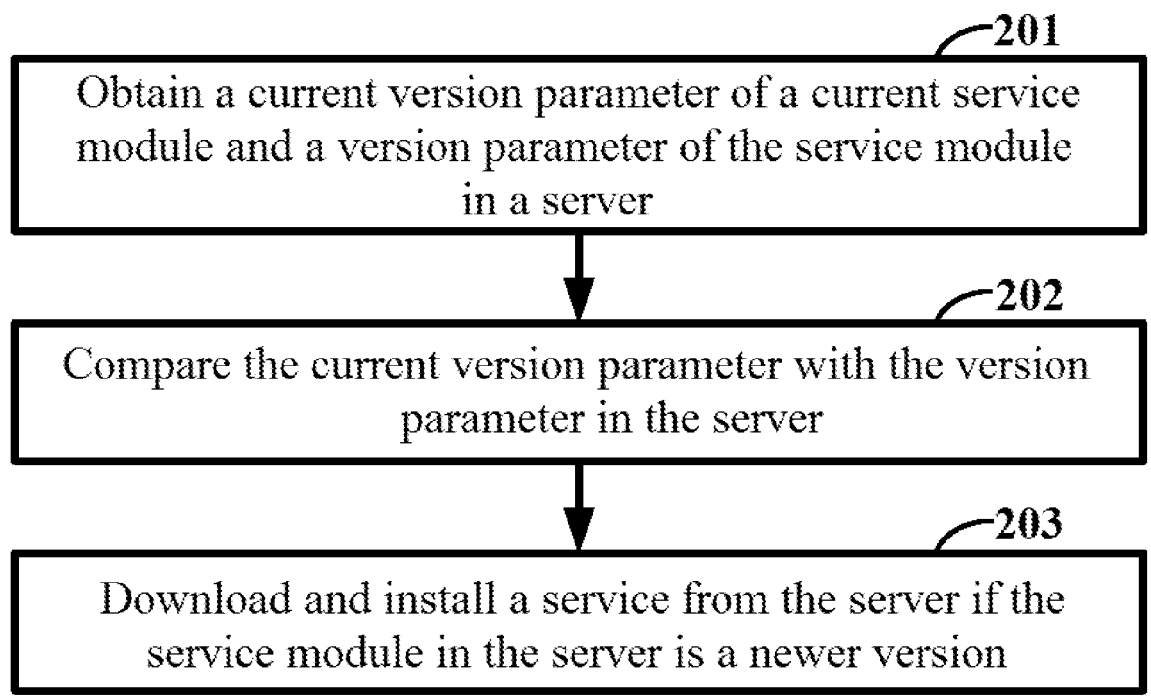
FIG. 2 is a flowchart of a method of managing external devices in accordance with another embodiments of the disclosure.

FIG. 2 is a flowchart of method of managing external devices in accordance with another embodiment of the disclosure. The method of embodiments of the disclosure can be implemented by a processor. It will be appreciated that, the method of embodiments of the disclosure is not limited to the specific steps and sequence as shown in the flowchart of FIG. 2. In various embodiments, one or more steps can be added to the steps shown in the flowchart of FIG. 2, one or more steps shown in the flowchart of FIG. 2 can be removed, or a sequence of performing the steps shown in the flowchart of FIG. 2 can be altered. In some embodiments, the method in accordance with embodiments of the disclosure can comprise steps 201 to 203.

In step 201, a current version parameter of a current service module and a version parameter of the service module in a server can be obtained upon receiving a starting signal.

In step 202, the current version parameter can be compared with the version parameter in the server.

In step 203, a service module can be downloaded and installed from the server if the service module in the server is a newer version.

Figure 3:
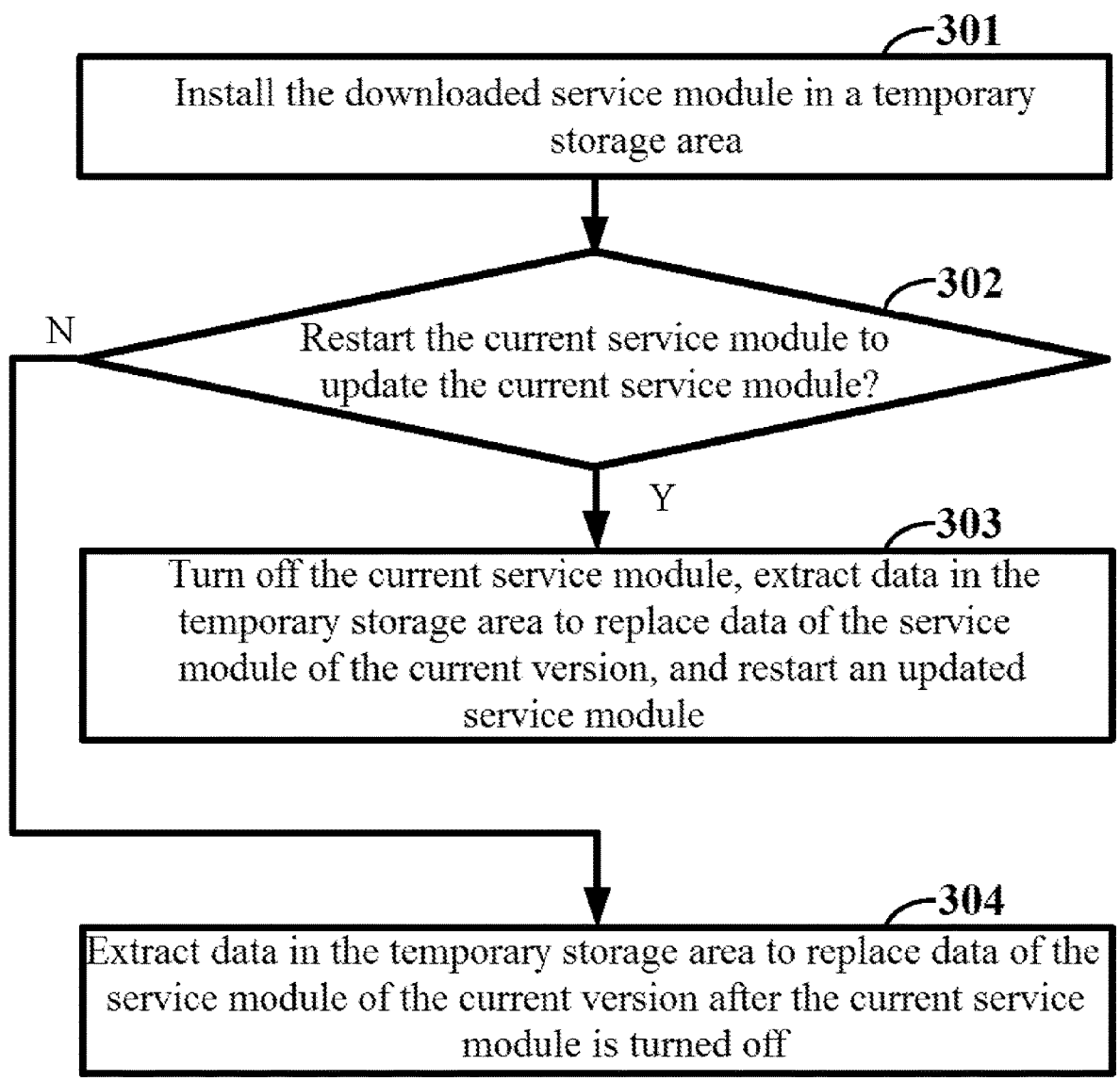
FIG. 3 is a detailed flowchart showing an embodiment of step 203 of FIG. 2.

In some embodiments, as shown in FIG. 3, the step 203 can comprise steps 301 to 304.

In step 301, the downloaded service module can be installed in a temporary storage area, such that the current service module can be used normally during a process of installing.

In step 302, a notification can be provided to a user, such that the user can decide whether to restart the current service module to update the current service module. A step 303 can be performed if the user decides to restart the current service module. A step 304 can be performed if the user decides to not restart the current service module.

In step 303, the current service module can be turned off, data in the temporary storage area can be extracted to replace data of the service module of the current version, and an updated service module can be restarted.

In step 304, data in the temporary storage area can be extracted to replace data of the service module of the current version after the current service module is turned off. In other words, the user can continue to use the current service module even if the service module of the newer version is downloaded and installed, the current service module can be updated after the current service module is turned off, and the user can use the updated service module only when the service module is started next time.

In accordance with embodiments of the disclosure, various modules can be independent from each other. For instance, a user interface module can be completely separate from a service module, and one service module can be completely separate from another service module. An extensibility of program functions can be improved, and a newer version of a service module can be automatically obtained from a server and installed to update data of the service module each time the service module is started.

Figure 4:
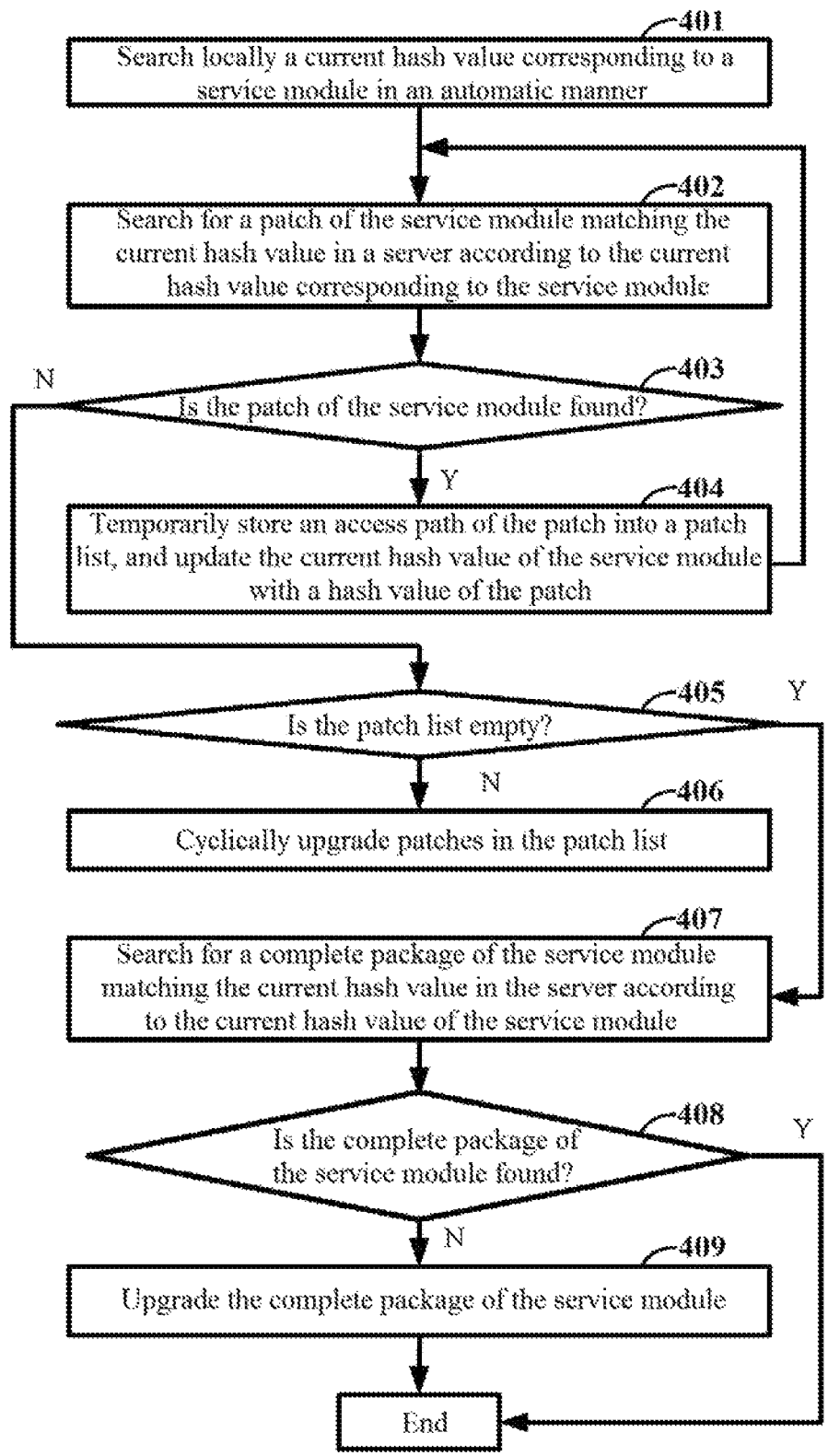
FIG. 4 is a flowchart of a method of managing external devices in accordance with yet another embodiment of the disclosure.

FIG. 4 is a flowchart of method of managing external devices in accordance with yet another embodiment of the disclosure. The method of embodiments of the disclosure can be implemented by a processor. It will be appreciated that, the method of embodiments of the disclosure is not limited to the specific steps and sequence as shown in the flowchart of FIG. 4. In various embodiments, one or more steps can be added to the steps shown in the flowchart of FIG. 4, one or more steps shown in the flowchart of FIG. 4 can be removed, or a sequence of performing the steps shown in the flowchart of FIG. 4 can be altered. In some embodiments, the method in accordance with embodiments of the disclosure can comprise steps 401 to 409.

In step 401, a current hash value corresponding to a service module can be locally searched in an automatic manner.

In step 402, a patch of the service module matching the current hash value can be searched in a server according to the current hash value corresponding to the service module.

In step 403, a determination can be made as to whether the patch of the service module matching the current hash value is found in the server. A step 404 can be performed if the patch of the service module matching the current hash value is found in the server. A step 405 can be performed if the patch of the service module matching the current hash value is not found in the server.

In step 404, an access path of the patch can be temporarily stored into a patch list, and the current hash value of the service module can be updated with a hash value of the patch. Then, the process returns to the step 402 to search for a patch of the service module matching the updated hash value in the server according to the updated current hash value of the service module.

In step 405, a determination can be made as to whether the patch list is empty. A step 406 can be performed if the patch list is not empty. A step 407 can be performed if the patch list is empty.

In step 406, patches in the patch list can be cyclically upgraded.

In step 407, a complete package of the service module matching the current hash value of the service module can be searched in the server according to the current hash value of the service module.

In step 408, a determination can be made as to whether the complete package of the service module matching the current hash value of the service module is found in the server. A step 409 can be performed if the complete package of the service module matching the current hash value of the service module is not found in the server. The complete package of the service module can be determined as the newest version if the complete package of the service module matching the current hash value of the service module is found in the server, and the upgrading process can thus be ended.

In step 409, the complete package of the service module can be upgraded.

With the method in accordance with embodiments of the disclosure, a patch package or a complete package of a service module can be automatically obtained from a server each time the service module is started to thereby automatically upgrade the service module, such that a need of a manual update by a user can be avoided.

Figure 5:
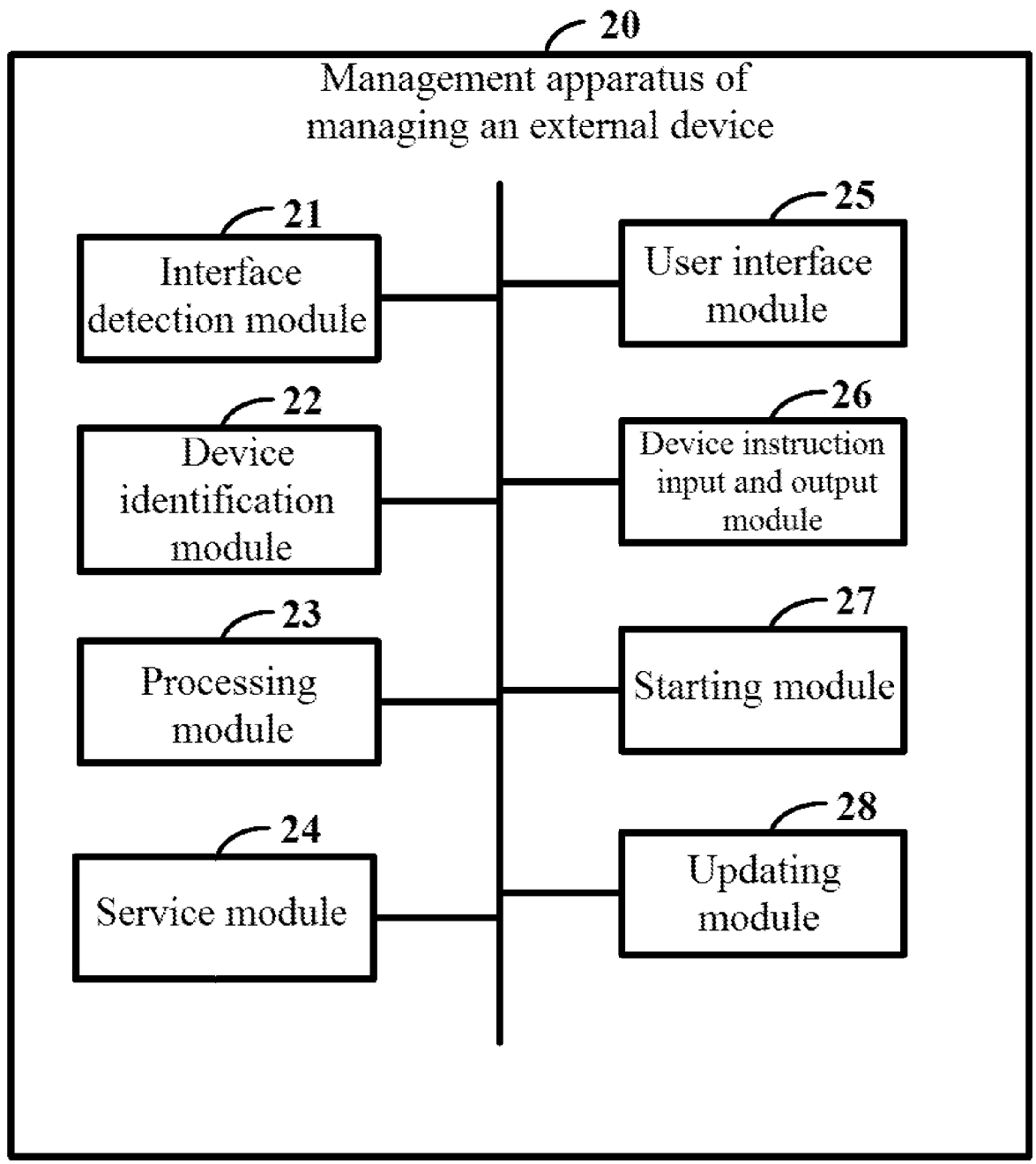
FIG. 5 shows a configuration of an apparatus of managing external devices in accordance with embodiments of the disclosure.

FIG. 5 shows a configuration of a management apparatus 20 of managing external devices in accordance with embodiments of the disclosure. The apparatus as described in accordance with embodiments of the disclosure can be provided in various control terminals, such as a smart phone, a tablet, or a computer.

Figure 6:
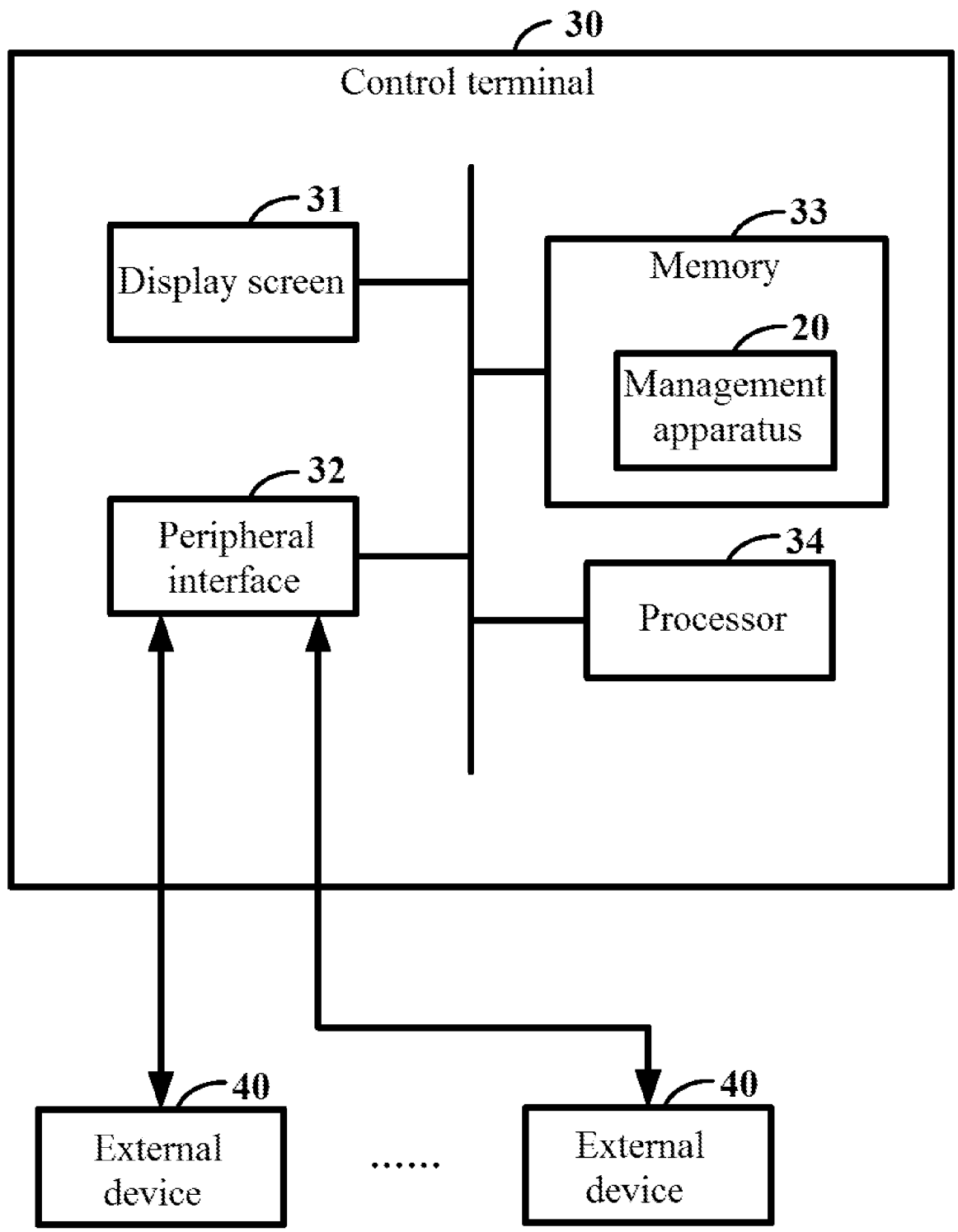
FIG. 6 shows of a configuration of a control terminal in accordance with embodiments of the disclosure.

As shown in FIG. 6, the control terminal 30 can further comprise, but not limited to, a display screen 31, a peripheral interface 32, a memory 33 and a processor 34. The display screen 31 can be configured to display an operation status of the management apparatus 20 and data to be interacted with a user. The display screen 31 can be a liquid crystal display (LCD), a touch screen or another type of screen.

A plurality of the peripheral interface 32 can be provided. The peripheral interfaces 32 can comprise, but not limited to, a universal serial bus (USB) interface, a micro USB interface or a cluster communication port (COM) interface. Therefore, various types of external devices 40 can be simultaneously connected via the peripheral interfaces 32. In some embodiments, the external devices 40 can be a flight controller or a remote controller of an aerial vehicle.

The memory 33 can be configured to store various types of data of the control terminal. In some instances, the memory 33 can be an internal memory of the control terminal 30. Optionally, the memory 33 can be a removable memory, such as a removable media card, an external U disk or other flash memories or storage devices. The processor can be configured to control an operation of the control terminal. The processor 34 can be a central processing unit (CPU), a microprocessor or other data processing chips.

The management apparatus 20 can be configured to display and configure a parameter of the external device 40. The external device 40 can be a functional component of an unmanned aerial vehicle (UAV). The functional component can comprise at least one of a flight controller, an electronic speed controller, a stabilizing device or a remote controller.

The management apparatus 20 can comprise an interface detection module 21, a device identification module 22, a processing module 23, a plurality of service modules 24 and a user interface module 25. As used herein, the term "module" can refer to a sequence of program instructions that can be executed by a computer (e.g., the processor of the control terminal) to achieve a particular function. The sequence of program instructions can be stored in a computer (e.g., in the memory of the control terminal).

In some embodiments, the user interface module 25 can be configured to configure a user interface and display the user interface on the display screen 31 of the control terminal 30. The interface detection module 21 can be configured to detect an external device connected to the peripheral interfaces, so as to determine whether a new external device is connected to the peripheral interface or whether a connected external device is removed from the peripheral interface.

The processing module 23 can be configured to identify an external device of a particular type according to a preset condition if a new external device is detected to be connected to the peripheral interface.

In some embodiments, the interface detection module 21 can be further configured to obtain hardware information of the external device connected to the peripheral interface. The processing module 23 can be configured to identify the external device of the particular type according to the preset condition and the hardware information.

In some embodiments, the hardware information can comprise at least a device interface type and a device manufacturer. The preset condition can be a particular device manufacturer.

In some embodiments, the processing module 23 can be further configured to push an external device connection event.

The device identification module 22 can be configured to obtain parameter information of an external device.

In some embodiments, the management apparatus 20 can further comprise a device instruction input and output module 26. In some instances, the device identification module 22 can be configured to turn on the external device using the device instruction input and output module 26, and send a preset identification protocol command to the external device to cause the external device to feedback device information of the external device to the device identification device 22 in response to the preset identification protocol command.

In some embodiments, the parameter information can comprise at least a device type and a device version number.

In some instances, the processing module 23 can be further configured to load a corresponding service module 24 according to the parameter information of the external device.

In some embodiments, the processing module 23 can be configured to, when loading the corresponding service module 24 according to the parameter information of the external device, load the corresponding service module 24 and establish a communication connection between the loaded service module 24 and the external device of a corresponding type, such that an operation control function is provided to the external device of the corresponding type by the loaded service module 24.

In some instances, the processing module 23 can be further configured to add a network interface provided by the loaded service module 24 to communicate with the user interface module 25.

In some instances, the processing module 23 can be further configured to send a network service request to the added network interface using the user interface module 25. A connection between the added network interface and the user interface module 25 can be established by the added network interface in response to the network service request, such that a functional communication between the loaded service module 24 and the user interface module 25 can be enabled. In other words, a functional communication can be performed between the user interface module 25 and the loaded service module 24 using the network interface provided by the loaded service module 24.

In some embodiments, data can be transferred between the user interface module 25 and the network interface in a Json format.

The processing module 23 can be further configured to push an external device removal if an external device is detected to be removed, and disconnect a connection between a corresponding network interface and the user interface module 25 and turn off a corresponding service module 24 according to parameter information of the removed external device.

Various external devices having different interfaces can be automatically identified by the management apparatus 20 in accordance with embodiments of the disclosure, and various modules can be independent from each other. For instance, a user interface module 25 can be completely separate from a service module 24, and one service modules 24 can be completely separate from another service module 24. A corresponding operation control function can be provided to an identified external device, and a third party user can be enabled to use a corresponding user interface, thereby there's no need for the user to select applications of different service modules 24 according to different types of external devices.

In some embodiments, the management apparatus 20 can further comprise a starting module 27 and an updating module 28. In some instances, the starting module 27 can be configured to start the management apparatus 20 upon receiving a starting signal. The updating module 28 can be configured to obtain a current version parameter of a current service module 24 and a version parameter of the service module 24 in a server after the starting signal is received by the starting module 27, and compare the current version parameter with the version parameter in the server.

The updating module 28 can be further configured to download and install a service module 24 from the server if the service module 24 in the server is a newer version.

In some embodiments, the updating module 28 can be configured to install the downloaded service module 24 in a temporary storage area, such that the current service module 24 can be used normally during a process of installing.

The processing module 23 can be further configured to provide a notification to a user, such that the user can decide whether to restart the current service module 24 to update the current service module 24.

In some instances, the updating module 28 can be further configured to turn off the current service module 24, extract data in the temporary storage area to replace data of the service module 24 of the current version, and restart an updated service module 24 if the user decides to restart the current service module 24.

Optionally, the updating module 28 can be further configured to extract data in the temporary storage area to replace data of the service module 24 of the current version after the current service module 24 is turned off if the user decides not to restart the current service module 24. In other words, the user can continue to use the current service module 24 even if the service module 24 of the newer version is being downloaded and installed, the current service module 24 can be updated by the updating module 28 after the current service module 24 is turned off, and the user can use the updated service module 24 only when the service module 24 is started next time.

In accordance with embodiments of the disclosure, various modules can be independent from each other. For instance, the user interface module 25 can be completely separate from the service module 24, and one service module 24 can be completely separate from another service module 24. An extensibility of program functions can be improved, and a newer version of a service module 24 can be automatically obtained from a server and installed to update data of the service module 24 each time the service module 24 is started.

In some embodiments, the updating module 28 can be further configured to locally search for a current hash value corresponding to a service module 24 in an automatic manner, and search for a patch of the service module 24 matching the current hash value in a server according to the current hash value corresponding to the service module 24.

The updating module 28 can be configured to temporarily store an access path of the patch of the service module 24 into a patch list if the patch matching the current hash value corresponding to a service module 24 is found in the server, update the current hash value of the service module 24 with a hash value of the patch, and continue to search for a patch of the service module 24 matching the updated hash value in the server according to the updated current hash value of the service module 24.

The updating module 28 can be configured to determine whether the patch list is empty if the patch of the service module 24 matching the current hash value corresponding to a service module 24 is not found in the server. The updating module 28 can be further configured to cyclically upgrade patches in the patch list if the patch list is not empty.

The updating module 28 can be further configured to search for a complete package of the service module 24 matching the current hash value in the server according to the current hash value of the service module 24 if the patch list is empty.

The updating module 28 can be further configured to upgrade the complete package of the service module 24 if the complete package of the service module 24 matching the current hash value corresponding to a service module 24 is not found in the server. The updating module 28 can be configured to determine that the complete package of the service module 24 is the newest version if the complete package of the service module 24 matching the current hash value corresponding to a service module 24 is found in the server (e.g., there is no need to upgrade the service module 24).

The management apparatus in accordance with embodiments of the disclosure can be enabled to automatically obtain a patch package and/or a complete package of a service module 24 from a server each time the service module 24 is started to thereby automatically upgrade the service module 24, such that a need of a manual update by a user can be avoided.

In some embodiments, the management apparatus 20 can be entirely provided in a control terminal (e.g., a smart phone, a tablet or a computer). The starting module 27 and the updating module 28 can be triggered simultaneously when the management apparatus 20 is turned on.

Alternatively, some modules of the management apparatus 20 (e.g., the user interface module 25) can be provided in a control terminal so as to provide the user interface module 25 in the control terminal for interacting with the user. The remaining modules of the management apparatus 20 can be provided in an external device (e.g., an aerial vehicle). The starting module 27 and the updating module 28 can be triggered when the external device is powered on or turned on. It will be appreciated that, in some embodiments, the remaining modules of the management apparatus 20 can be provided in a memory of the external device to implement a specific function upon execution by the external device (e.g., a main controller of a flight controller).

It will be appreciated that, an implementation of modules of the management apparatus 20 in accordance with embodiments of the disclosure can be apparent with reference to corresponding steps as described in the embodiments of FIGS. 1 to 4.

Figure 7:
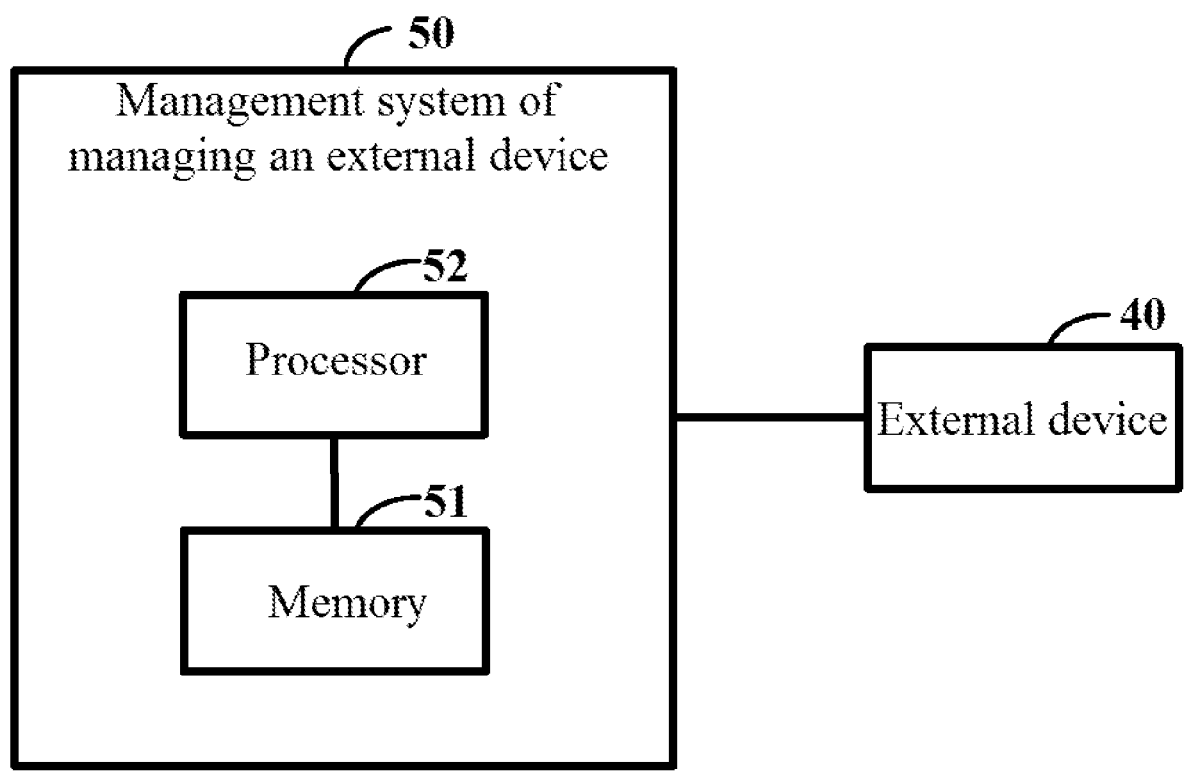
FIG. 7 shows a configuration of a system of managing external devices in accordance with embodiments of the disclosure.

FIG. 7 shows a configuration of a management system 50 of managing external devices in accordance with embodiments of the disclosure. The management system 50 can comprise a memory 51 and a processor 52. The memory 51 can be configured to store program instructions of the management apparatus 20. The processor 52 can be configured to obtain and execute the program instructions stored in the memory to implement the method of managing the external device as described in the embodiments of FIGS. 1 to 4. In some embodiments, the management system 50 can further comprise a control terminal (not shown). The memory 51 and the processor 52 can be provided in the control terminal.

In some embodiments, the external device 40 can be an unmanned aerial vehicle (UAV). The UAV can comprise various functional components. Parameters of the functional components can be displayed and configured by the management system 50 of managing external devices. The functional components can comprise at least one of a flight controller, an electronic speed controller, a stabilizing device or a remote controller.

It will be appreciated that, the device and method disclosed in embodiments of the disclosure can be implemented in various other manners. For instance, the described device embodiments are merely illustrative. For instance, a division of modules or units is merely a division based upon a logical function. Various divisions can be possible in actual implementation. For instance, multiple units or components can be combined or integrated on another system. For instance, some features can be ignored or not be performed. For instance, a mutual coupling, a direct coupling or a communication connection as shown or discussed can be an indirect coupling or a communication connection via an interface, a means or a unit. The coupling can be an electrical coupling or a mechanical coupling.

The units illustrated as separate parts may or may not be physically separated. The parts shown as units may or may not be physical units. For instance, the parts can be provided at the same location or distributed over a plurality of network units. All or part of the units can be selected to implement the embodiments of the disclosure according to actual requirements.

Various functional units in the embodiments of the disclosure may be integrated in one processing unit. The functional units can be separate and physical units. Two or more units may be integrated in one unit. The integrated units may be implemented as hardware or software functional units.

The integrated units, if implemented as software functional units and sold or used as independent products, may be stored in a computer-readable storage medium. With such an understanding, all or part of the technical solution may be embodied as a software product. The computer software product is stored in a storage medium and includes several instructions for causing a computer processor to execute all or part of a method according to the various embodiments of the present disclosure, such as one of the above-described example method. The above mentioned storage medium includes: various media capable of storing program code, such as a U disk, a removable hard disk, ROM (read-only memory), RAM (random access memory), a diskette, an optical disk, etc.

The embodiments as described hereinabove are intended to merely illustrate rather than limit the disclosure. While some embodiments of the disclosure are shown and described herein, numerous variations and substitutions will occur to those skilled in the art without departing from the scope of the disclosure.

What is claimed is:

1. A method by a management apparatus, comprising:
   detecting a plurality of types of external devices each connected to one of a plurality of peripheral interface of the management apparatus, a first one of the plurality of peripheral interfaces corresponding to a first type of the plurality of types, a second one of the plurality of peripheral interfaces corresponding to a second type of the plurality of types, and the external devices including at least one of a flight controller, a remote controller for an aerial vehicle, or an inertial measurement unit;
   obtaining parameter information of the external devices;
   loading a plurality of service modules into the management apparatus according to the parameter information of the external devices, each of the plurality of service modules corresponding to one of the external devices, and the plurality of services modules being independent from each other;
   enabling a communication between a user interface module and one of a plurality of network interfaces each corresponding to one of the plurality of service modules;
   obtaining, upon receiving a starting signal for one of the plurality of services modules, a current version parameter of the one of the plurality of service modules and a version parameter of the one of the plurality of service modules in a server;
   comparing the current version parameter with the version parameter in the server; and
   in response to a result of the comparison indicating that a version of the one of the plurality of service modules in the server is a newer version of the one of the plurality of service modules, downloading the newer version of the one of the plurality of service modules from the server and installing the newer version of the one of the plurality of service modules.

2. The method of claim 1, wherein loading the plurality of service modules in the management apparatus includes:
   establishing a communication connection between one of the plurality of service modules and one of the external devices corresponding to the one of the plurality of services modules to allow the one of the plurality of service modules to provide an operation control function to the corresponding one of external devices.

3. The method of claim 2, further comprising:
   sending a network service request to each of the plurality of network interfaces using the user interface module; and
   establishing a connection between each of the plurality of network interfaces and the user interface module in response to the network service request, to enable a functional communication between each of the plurality of service modules and the user interface module.

4. The method of claim 3, wherein data is transferred between the user interface module and the plurality of network interfaces in a Json format.

5. The method of claim 3, further comprising:
   detecting that one of the external devices is removed;
   pushing an external device removal event; and
   disconnecting a connection between a network interface corresponding to the removed one of the external devices and the user interface module and turning off a service module corresponding to the removed one of the external devices according to the parameter information of the removed one of the external devices.

6. The method of claim 1,
   wherein the external devices include a particular-type external device;
   the method further comprising, before obtaining the parameter information of the external devices:
   identifying the particular-type external device from the external devices according to a preset condition.

7. The method of claim 6, wherein identifying the particular-type external device according to the preset condition includes:
   obtaining hardware information of the external devices; and
   identifying the particular-type external device according to the preset condition and the hardware information.

8. The method of claim 7, wherein:
   the hardware information includes at least a device interface type and a device manufacturer name; and
   the preset condition is a particular device manufacturer name.

9. The method of claim 1, wherein obtaining the parameter information of the external devices includes:
   turning on the external devices and sending a preset identification protocol command to each of the plurality of external devices to cause the external devices to feedback device information of the external devices in response to the preset identification protocol command.

10. The method of claim 9, wherein the parameter information includes at least a device type and a device version number.

11. The method of claim 1, wherein installing the newer version of the one of the plurality of service modules includes:
    installing the newer version of the one of the plurality of service modules in a temporary storage area;
    providing a notification to a user;
    in response to the user instructing to restarting the one of the plurality of service modules:
      turning off the one of the plurality of service modules;
      extracting data in the temporary storage area to replace a current version of the one of the plurality of service modules to update the one of the plurality of service modules to the newer version; and
      starting the newer version of the one of the plurality of service modules; and
    in response to the user instructing not to restart the one of the plurality of service modules:
      extracting the data in the temporary storage area to replace the current version of the one of the plurality of service modules after the one of the plurality of service modules is turned off.

12. The method of claim 1, further comprising:
    automatically searching locally for a current hash value corresponding to the one of the plurality of service modules;
    searching, in a server, for a patch of the one of the plurality of service modules matching the current hash value according to the current hash value;
    determining whether a patch list is empty in response to the patch matching the current hash value not being found in the server; and
    cyclically upgrading patches in the patch list in response to the patch list being not empty.

13. The method of claim 12, further comprising:
    in response to the patch matching the hash value being found in the server, temporarily storing an access path of the patch matching the current hash value into the patch; and updating the current hash value of the one of the plurality of service modules with a hash value of the patch matching the current hash value, and continuing to search, for a patch of the one of the plurality of service modules matching the updated hash value according to the updated hash value of the one of the plurality of service modules.

14. The method of claim 13, further comprising:
in response to the patch list being empty, searching, in the server, for a complete package of the one of the plurality of service modules matching the current hash value according to the current hash value of the one of the plurality of service modules; and
in response to the complete package of the one of the plurality of service modules matching the current hash value being not found in the server, upgrading the complete package of the one of the plurality of service modules.

15. A management apparatus comprising:
a control terminal; and
a processor configured to:
  detect a plurality of types of external devices each connected to one of a plurality of peripheral interface of the management apparatus, a first one of the plurality of peripheral interfaces corresponding to a first type of the plurality of types, a second one of the plurality of peripheral interfaces corresponding to a second type of the plurality of types, and the external devices including at least one of a flight controller, a remote controller for an aerial vehicle, or an inertial measurement unit;
  obtain parameter information of the external devices;
  load a plurality of service modules into the management apparatus according to the parameter information of the external devices, each of the plurality of service modules corresponding to one of the external devices, and the plurality of services modules being independent from each other;
  enable a communication between a user interface module and one of a plurality of network interfaces each corresponding to one of the plurality of service modules;
  obtain, upon receiving a starting signal for one of the plurality of services modules, a current version parameter of the one of the plurality of service modules and a version parameter of the one of the plurality of service modules in a server;
  compare the current version parameter with the version parameter in the server; and
  in response to a result of the comparison indicating that a version of the one of the plurality of service modules in the server is a newer version of the one of the plurality of service modules, download the newer version of the one of the plurality of service modules from the server and install the newer version of the one of the plurality of service modules.

16. The system of claim 15, wherein the processor is provided in the control terminal.

17. An unmanned aerial vehicle comprising:
a functional component; and
a management apparatus comprising:
  a control terminal; and
  a processor configured to:
    detect a plurality of types of external devices each connected to one of a plurality of peripheral interface of the management apparatus, a first one of the plurality of peripheral interfaces corresponding to a first type of the plurality of types, a second one of the plurality of peripheral interfaces corresponding to a second type of the plurality of types, and the external devices including at least one of a flight controller, a remote controller for an aerial vehicle, or an inertial measurement unit;
    obtain parameter information of the external devices;
    load a plurality of service modules according to the parameter information of the external devices, each of the plurality of service modules corresponding to one of the external devices, and the plurality of services modules being independent from each other;
    enable a communication between a user interface module and one of a plurality of network interfaces each corresponding to one of the plurality of service modules;
    obtain, upon receiving a starting signal for one of the plurality of services modules, a current version parameter of the one of the plurality of service modules and a version parameter of the one of the plurality of service modules in a server;
    compare the current version parameter with the version parameter in the server; and
    in response to a result of the comparison indicating that a version of the one of the plurality of service modules in the server is a newer version of the one of the plurality of service modules, download the newer version of the one of the plurality of service modules from the server and install the newer version of the one of the plurality of service modules;
  wherein the management apparatus is configured to configure and display a parameter of the functional component, the external devices include the functional component.

18. A memory storing program instructions that, upon being executed by a processor of a management apparatus, cause the processor to:
  detect a plurality of types of external devices each connected to one of a plurality of peripheral interface of the management apparatus, a first one of the plurality of peripheral interfaces corresponding to a first type of the plurality of types, a second one of the plurality of peripheral interfaces corresponding to a second type of the plurality of types, and the external devices including at least one of a flight controller, a remote controller for an aerial vehicle, or an inertial measurement unit;
  obtain parameter information of an external devices;
  load a plurality of service modules into the management apparatus, according to the parameter information of the external devices, each of the plurality of service modules corresponding to one of the external devices, and the plurality of services modules being independent from each other;
  enable a communication between a user interface module and one of a plurality of network interfaces each corresponding to one of the plurality of service modules;
  obtain, upon receiving a starting signal for one of the plurality of services modules, a current version parameter of the one of the plurality of service modules and a version parameter of the one of the plurality of service modules in a server;
  compare the current version parameter with the version parameter in the server; and in response to a result of the comparison indicating that a version of the one of the plurality of service modules in the server is a newer version of the one of the plurality of service modules, download the newer version of the one of the plurality of service modules from the server and install the newer version of the one of the plurality of service modules.

19. The memory of claim 18, wherein the program instructions further cause the processor to:

establish a communication connection between one of the plurality of service modules and one of the external devices corresponding to the one of the plurality of services modules to allow the one of the plurality of service modules to provide an operation control function to the corresponding one of external devices.

* * * * *